US007711822B1

(12) United States Patent
Duvur et al.

(10) Patent No.: US 7,711,822 B1
(45) Date of Patent: May 4, 2010

(54) RESOURCE MANAGEMENT IN APPLICATION SERVERS

(75) Inventors: Sreeram Duvur, Fremont, CA (US); Jean-Francois Arcand, Provost (CA)

(73) Assignee: Oracle America, Inc., Redwood Shores, CA (US)

( * ) Notice: Subject to any disclaimer, the term of this patent is extended or adjusted under 35 U.S.C. 154(b) by 460 days.

(21) Appl. No.: 11/691,434

(22) Filed: Mar. 26, 2007

(51) Int. Cl.
*G06F 13/00* (2006.01)
(52) U.S. Cl. .................. 709/226; 709/224; 709/229
(58) Field of Classification Search ................ 709/213, 709/223, 224, 226, 227, 229
See application file for complete search history.

(56) References Cited

U.S. PATENT DOCUMENTS

| | | | |
|---|---|---|---|
| 5,991,792 A * | 11/1999 | Nageswaran | 718/102 |
| 6,609,138 B1 | 8/2003 | Merriam | |
| 6,766,349 B1 | 7/2004 | Belkin | |
| 6,816,885 B1 | 11/2004 | Raghunandan | |
| 6,832,244 B1 | 12/2004 | Raghunandan | |
| 6,886,041 B2 * | 4/2005 | Messinger et al. | 709/226 |
| 6,965,919 B1 | 11/2005 | Woods et al. | |
| 7,032,222 B1 * | 4/2006 | Karp et al. | 718/104 |
| 7,530,068 B2 * | 5/2009 | Clark et al. | 718/100 |
| 7,580,972 B2 * | 8/2009 | Jones et al. | 709/203 |
| 2004/0088413 A1 * | 5/2004 | Bhogi et al. | 709/226 |
| 2004/0205760 A1 | 10/2004 | Foote et al. | |
| 2006/0070114 A1 | 3/2006 | Wood et al. | |
| 2006/0190482 A1 * | 8/2006 | Kishan et al. | 707/103 Y |
| 2006/0200820 A1 | 9/2006 | Cherkasova et al. | |
| 2006/0212871 A1 | 9/2006 | Cook | |
| 2008/0155100 A1 * | 6/2008 | Ahmed et al. | 709/226 |

OTHER PUBLICATIONS

U.S. Appl. No. 11/639,696, filed Dec. 15, 2006, Marc S. Chametzky.

* cited by examiner

*Primary Examiner*—Viet Vu
(74) *Attorney, Agent, or Firm*—Martine Penilla & Gencarella LLP

(57) ABSTRACT

The present invention is directed to a method, a computer readable medium and a and a system of managing consumption of computing environment resources by multiple applications that features limiting resource consumption based upon examination of the total real-time resources of a computing environment being consumed rather than by the total resources available. The method includes observing communication between computing resources and multiple applications to obtain a real usage profile (RUP), for one of the multiple applications. A request to consume resources of the computing environment is received for one of the multiple applications. It is determined whether the whether granting access in response to the request violates a desired usage profile (DUP) based upon real usage profile. The computer-readable medium includes computer instructions to facilitate carrying-out of the functions of the claimed method by a general computing system. The system includes features capable of carrying-out the functions of the method.

20 Claims, 5 Drawing Sheets

RESOURCE MANAGEMENT IN APPLICATION SERVERS

BACKGROUND OF THE INVENTION

The present invention is directed to managing resource utilization in a computing environment and more particularly to managing usage of computing resources in a virtual machine computing environment.

A constant drive exists to maximize the efficiency of computing environments. The efficacy by relying solely upon a computing environment's operating system (O/S) for resource management has become imprudent in many situations. Many current computing environments rely upon object-based systems in which a virtual machine (VM) facilitates operation upon an application layer by a hardware layer. An example of a VM is known as a Java Virtual machine (JVM). A typical VM consists of a software layer operating upon a hardware layer that includes an O/S layer in data communication with a hardware layer. The VM virtualizes the available resources of the host platform to thereby facilitate communication between an application layer and the hardware layer vis-a-vis one or more O/Ss resident in the O/S layer. In this manner, the VM provides an abstraction of a complete computer system to higher-level software, e.g., application software. Many advantages are provided by the VM, including multiplexing the use of the hardware layer among two or more software applications and/or multiple instances of the same software application. As a result, it is realized that the VM manages a computing environment's resources. There have been many prior art attempts to improve management of a computing environment's resources of an object-based system.

In U.S. Pat. No. 7,073,177 to Foote et al., which is assigned to assignee of the present application, disclosed are methods and apparatuses for managing resources that includes a resource manager regulating resource consumption of several resource entities, each of which is capable of consuming resources. The resource manager tracks the availability of such resources and determines whether a resource is critically short or reaches a particular usage level. When a resource becomes critically short or reaches a particular usage level, the resource manager selects one or more resource entities based on one or more criteria. For example, a resource entity which has the least restrictive resource usage policy or state is selected. The resource manager then requests that the selected resource entity changes resource usage state to a more restrictive state. When resource usage reaches an acceptable level, the resource manager may also inform each resource entity (or previously selected resource entities) establish a less restrictive resource consumption state.

United States patent publication number 2006/0200820 to Cherkasova et al., discloses a method that includes observing communication from a virtual machine (VM) to a domain in which a device driver for a shared resource resides. The method further comprises determining, based on the observed communication, CPU utilization of the domain that is attributable to the VM. According to at least one embodiment, a system comprises a Central Processing Unit (CPU), Virtual Machines (VMs), and a domain in which a device driver for a shared resource resides. The domain is operable to receive requests from the VMs for access to the shared resource. The system further comprises a CPU utilization monitor operable to determine an amount of CPU utilization of the domain in processing the received requests that is attributable to each of the VMs.

United States patent publication number 2006/0212871 to Cook discloses a method, system, and article of manufacture, wherein a first indicator indicates a recommended resource requirement for an application is read. A second indicator indicates a permissible flexibility in the recommended resource requirement for the application is read. The application is allocated to a processing entity of a plurality of processing entities based the first and the second indicators A need exists, therefore, to provide improved resource management of object-based computing environments.

SUMMARY OF THE INVENTION

The present invention is directed to a method, a computer readable medium and a and a system of managing consumption of computing environment resources by multiple applications that features limiting resource consumption based upon examination of the total real-time resources of a computing environment being consumed rather than by the total resources available. The method includes observing communication between computing resources and multiple applications to obtain a real usage profile (RUP), for one of the multiple applications. A request to consume resources of the computing environment is received for one of the multiple applications. It is determined whether the whether granting access in response to the request violates a desired usage profile (DUP) based upon real usage profile. For example, it could be determined whether the granting of the request would violate a policy that is for the application that is associated with the request or another general access policy. The computer-readable medium includes computer instructions to facilitate carrying-out of the functions of the claimed method by a general computing system. The system includes features capable of carrying-out the functions of the method. These and other embodiments are described more fully below.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

Figure 1:
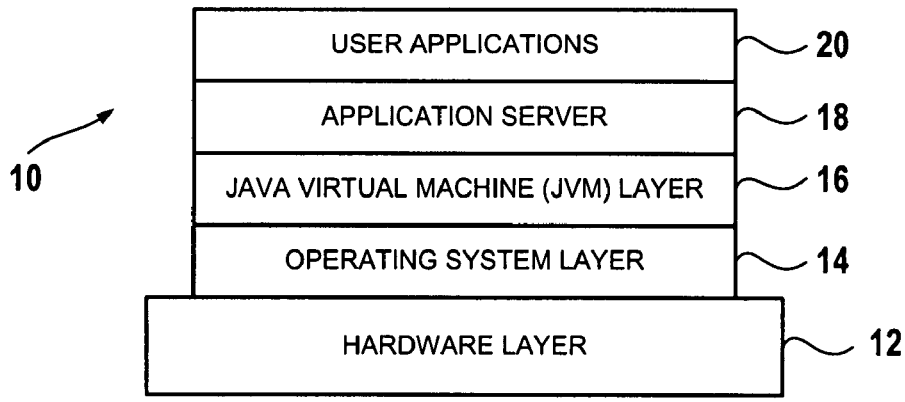
FIG. 1 is a simplified plan view showing the various layers of abstraction of a computing environment in accordance with one embodiment of the present invention.
Figure 3:
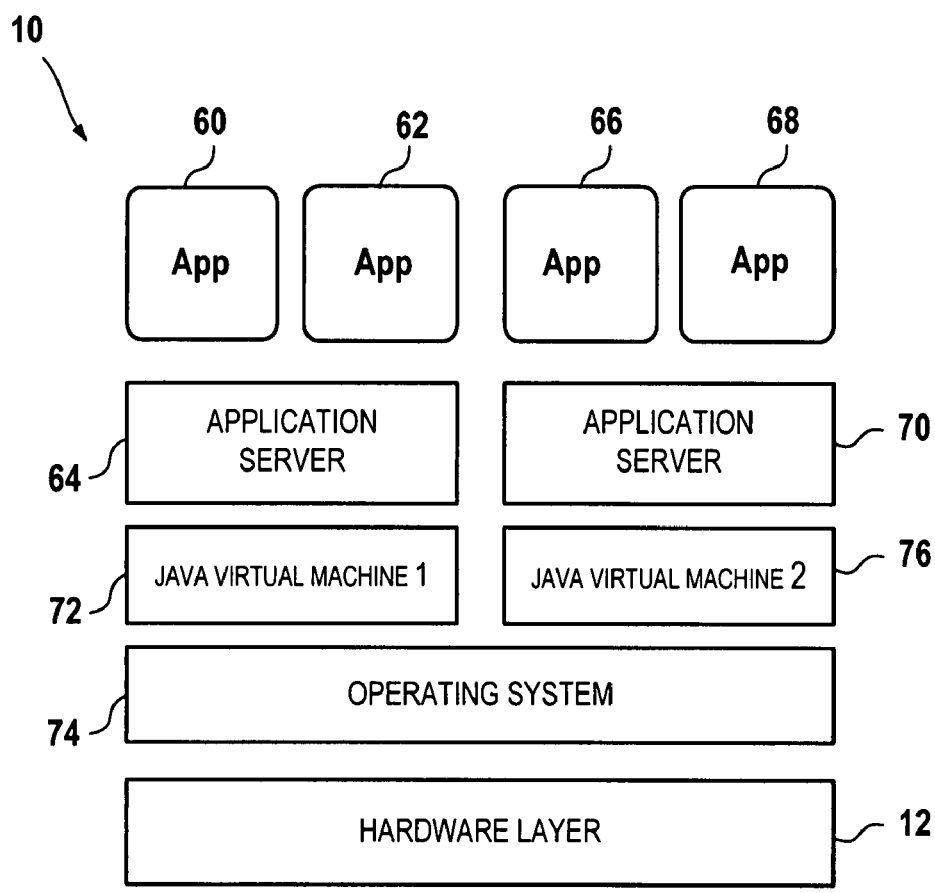
FIG. 3 is a detailed plan view of the computing environment shown in FIG. 1.

Referring to FIG. 1, a computing environment 10 is shown including a hardware layer 12, an operating system layer 14, a JAVA® virtual machine (JVM®) layer 16, an application server 18 and a user applications layer 20. JVM® layer 16 is a software layer developed with a programming language, referred to as JAVA®, which is designed to generate applications that can run on all hardware platforms, small, medium and large, without modification and/or allow applications written with languages other than JAVA® to run on any platform and with any operating system.

Figure 2:
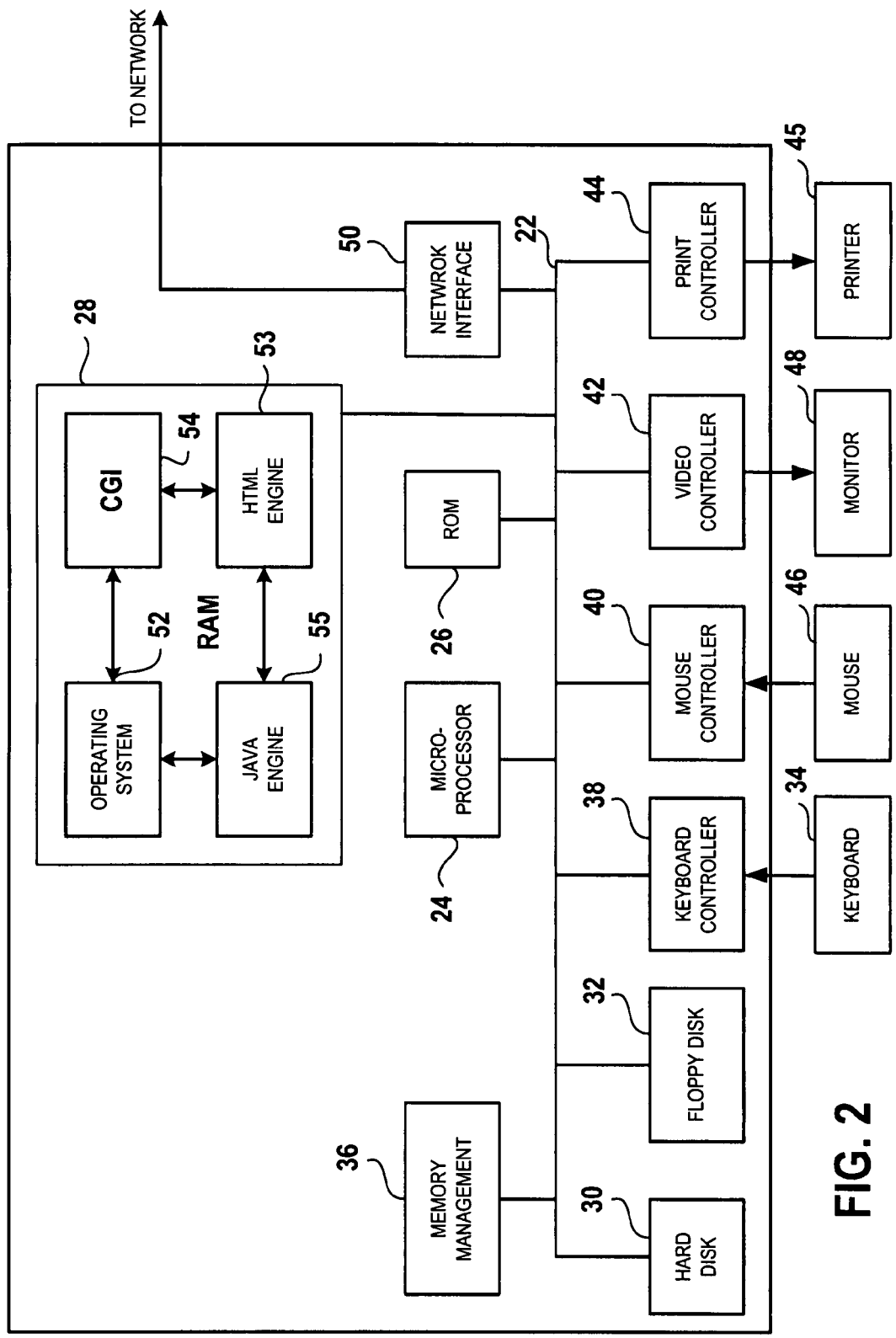
FIG. 2 is a schematic view of a hardware layer of the computing environment shown in FIG. 1.

Referring to FIG. 2, hardware layer 12 typically includes one or more system buses 22 placing various components of layer 12 in data communication. For example, a microprocessor cluster 24 is placed in data communication with both a read only memory (ROM) 26 and random access memory (RAM) 28 via system bus 22. The ROM 26 contains among other code, the Basic Input-Output system (BIOS) which controls basic hardware operation such as the interaction with peripheral components, e.g., disk drives 30 and 32, as well as the keyboard 34. The RAM 28 is the main memory into which the operating system and application programs are loaded and affords at least 32 megabytes of memory space. The memory management chip 36 is in data communication with system bus 22 to control direct memory access (DMA) operations. DMA operations include passing data between the various components of the memory space of environment 10, i.e., RAM 28 and hard disk drive 30 and floppy disk drive 32. Also in data communication with system bus 22 are various I/O controllers: a keyboard controller 38, a mouse controller 40, a video controller 42, and a print controller 44. The keyboard controller 38 provides a hardware interface for the keyboard 36, the mouse controller 40 provides the hardware interface for a mouse 46, or other point and click device, and the video controller 40 provides a hardware interface for a monitor 48. Print controller provides a hardware interface of printer 45. A network interface 50 enables data communication over the network. RAM 28 typically includes an operating system 52 resident therein. The operating system 52 of the computer 14 may be SOLARIS®, MACINTOSH®, UNIX, WINDOWS® XP®, or other known operating system. In the present example, system 52 is WINDOWS® XP®. In data communication with operating system 52 are a number of application specific software, such as a text editor, mail client, database, and the like, shown generally as application software 53.

Referring to FIGS. 1 and 2, JVM layer 16 compiles applications, such as App 60, App 62, running on application server 64, and App 66, and App 68, running on Application Server 70. To that end, JVM layer 16 includes a class loader that loads the byte-code class files as needed so that the class files may be decoded into suitable machine code for the operating system 74 in communication with the particular application App 60, App 62, App 66 and App 68 in the application layer 20 communicating with hardware layer 12. In this fashion, JVM layer 16 provides a level of abstraction between the machine dependent applications, App 60, App 62, App 66 and App 68, in applications layer 20 and the machine-dependent instruction set of operating system layer 14.

Figure 4:
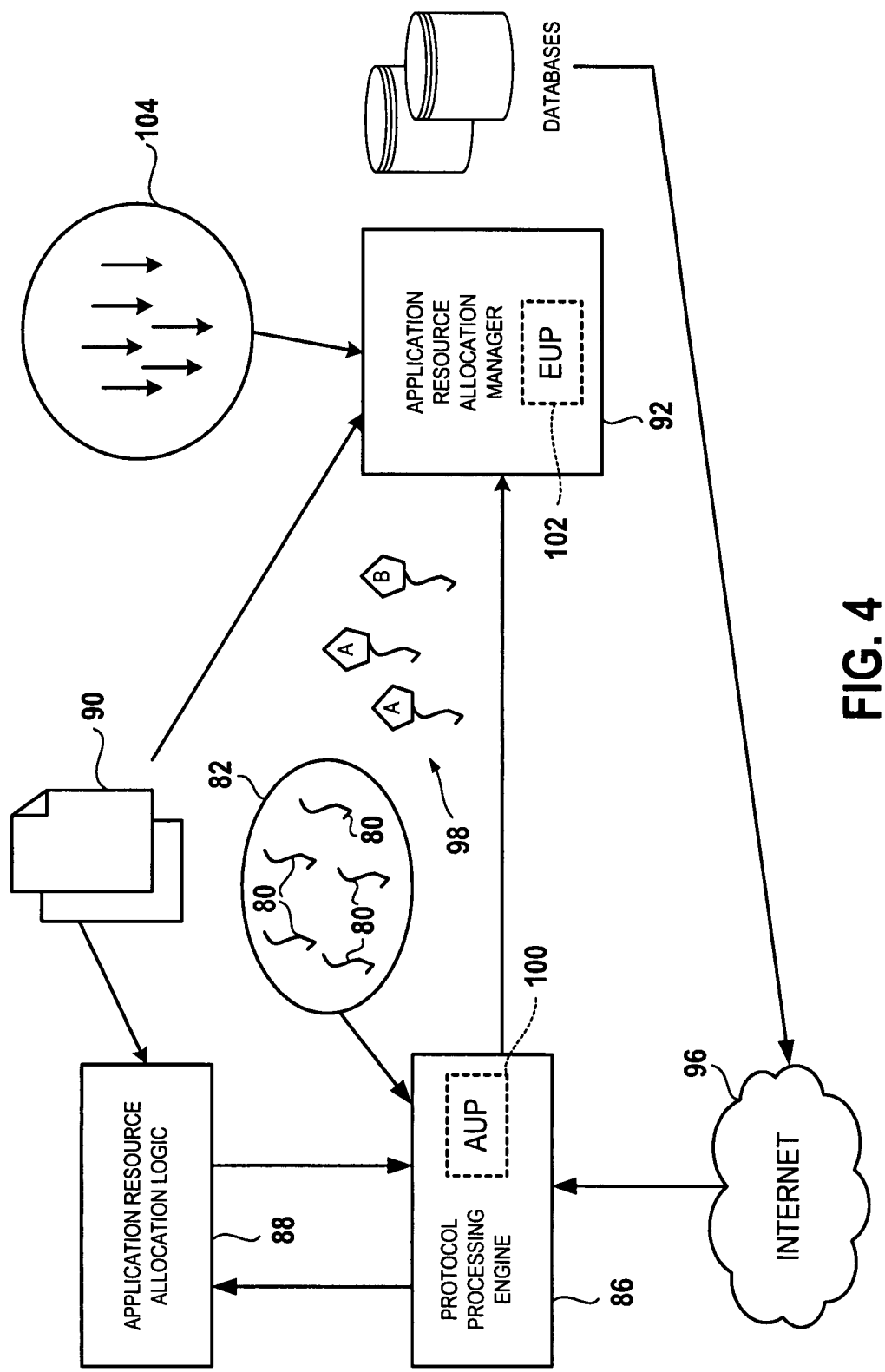
FIG. 4 is a schematic view of a server layer of the computing environment shown in FIG. 1.

Referring to both FIGS. 2 and 4, the present environment 10 is configured to process a large number of requests for environment resources, concurrently. To that end, application server layer 18 implements a transaction technique referred to as multi-threading. In a multi-threaded environment there is allocated, within a single process space, a plurality of threads 80 of execution, referred to as a request executor thread pool 82. Each thread 80 of execution has associated therewith a data list stored in the memory space of hardware layer 12, referred to as a stack. Each thread 80 is used to execute a specific set of computer code during a processing cycle. During execution, each of threads 80 uses information in the stack to record state and other related information concerning the execution of the threads 80 associated therewith. Typically thread-specific information is not accessed or altered by the remaining threads 80 of request executor thread pool 82, allowing each thread 80 to execute code independent of the remaining threads 80 of request executor thread pool 82. As a result, multiple threads 80 are able to service multiple requests for environment resources, concurrently. Although each thread 80 can record data associated therewith in a stack independent of the remaining threads 80 of request executor thread pool 82, each threads 80 may also share a stack of data with one or more threads 80 of request executor thread pool 82. To that end, request executor thread pool 82 is associated with a process space, e.g., an instance of a particular application App 60, App 62, App 66 and/or App 68.

Allocation of threads 80 is achieved by giving a unique thread ID and associating the same with a stack having a desired size in the memory space such that all threads 80 associated with request executor thread pool 82 have a common stack size. Request executor thread pool 82 is generated once the process space is created, allowing environment 10 to service requests for environment resources. When servicing a request, a set of code is executed to carry out functions required to satisfy the request. The execution of the set of code is carried out using the assigned threads 80 of request executor thread pool 82, as well as its corresponding stack. Multiple requests can be serviced concurrently; thus, if an additional request is received during the servicing of an existing request, a thread 80 of request executor thread pool 82, which is not currently servicing any request, may be used to satisfy the additional request. Once the request is satisfied, the threads 80 assigned to service request is returned to request executor thread pool 82, i.e., the thread 80 is indicated as being allowable to service an additional request. To satisfy incoming requests for environment resources application server layer 18 includes a protocol processing engine (PPE) 86, application resource allocation (ARA) logic 88, a resource allocation policy description (APD) 90, an application resource allocation manager (ARAM) 92 and a resource connection database (RCD) 94.

The environment resources consumed are dependent upon those that are the subject of the request. For example, were the request for an HTML page and all policy constraints were satisfied, PPE 86 would allocate one or more threads 80 from resource executor thread pool 82 to HTML engine 53 for further processing of the request. Were the request for a common gateway interface (CGI) program, PPE 86 would allocate one or more threads 80 from resource executor thread pool 82 to CGI engine 54 for further processing of the request. Were the request for a Java type surface, PPE 86 would allocate one or more threads 80 from resource executor thread pool 82 to JAVA® engine 55 for further processing of the request. It should be understood that the aforementioned requests are merely examples and that many other requests are within the scope of the present discussion. To that end, PPE 86, ARA logic 88, APD 90, ARAM 92 and connection database 94, each includes computer readable information to address situations when the number of threads 80 available in computing environment 10 is relatively small compared to the number of requests that may be expected to be serviced by computing environment 10.

The present invention affords an end user of computing environment 10 to control the resources consumed by application server layer 18 based upon the total number of threads 80 that may be consumed by any given application, as opposed to the total available computing resources in environment 10. As a result, an end user is provided the ability to reserve any desired quantity of the total threads 80 available for processing requests from a desired application App 60, App 62, App 66 and App 68. In furtherance of specifying limits on resource consumption by any given application App 60, App 62, App 66 and App 68 of application server layer 18. This may be useful in protecting from denial of service style attacks as well as preventing in accessibility to one of co-hosted applications and application server layer 18. Thus, prioritizing requests in furtherance of managing resources of computing environment 10 becomes important.

When a request is received, for example, from a network, such as a wide area network, e.g., the Internet 84, by environment 10, PPE 86 parses the head of the request and passes the same onto ARA Logic 88. ARA logic 88 identifies the request and the resources that are being requested and obtains from a desired usage profile (DUP) 90, the constraints associated with the requested resources. DUP 90 contains computer-readable information that describes the quantity of environment resources that may be consumed by one or more of applications App 60, App 62, App 66 and App 68, as well as the duration the resources may be allocated by the same, which is referred to as a desired usage profile (DUP) 88. Also included in DUP 88 is relational resource prioritization (RRP) information 90. RRP information 90 defines the priority of resource allocation given to each application App 60, App 62, App 66 and App 68. For example, assume App 60 is currently accessing environment resources, with the environment resources being entirely consumed. Assume App 62 issues a request to access environment 10 resources. Were RRP 90 found to indicate that App 62 has higher priority than App 60, one of threads 80 utilized to provide App 60 with access to environment 10 resources would be reallocated to App 62. For example, assume that the request was directed to environment resources for App 60, ARA logic 88 would identify constraints from APD 90 that relate to App 60, which are referred to as an application specific access policy (ASAP).

ARA logic 88 transmits ASAPs related to the request to PPE 86. PPE 86 verifies whether the constraints related to environment 10 resources that are the subject of the requests are satisfied. Specifically, PPE 86 includes computer-readable information concerning a real usage profile (RUP) for each of applications App 60, App 62, App 66 and App 68. For example, PPE 86 may include application usage profile (AUP) 100 information that include a number or percentage of threads 80 currently allocated to a particular application, e.g., App 60, App 62, App 66 and App 68, as well as, the number of compute cycles for which each of threads 80 have been allocated. Were the constraints satisfied, i.e., the policy is not violated, then a thread 80 from request executor thread pool 82 would be allocated. As a result, PPE 86 allows the application that is responsible for the request to make applications calls to an Application Resource Allocation Manager (ARAM) 92.

ARAM 92 identifies from DUP 90 whether general policy constraints for environment 10 have been violated for the request. To that end, ARAM 92 contains computer-readable information that describes another portion of the RUP information, general environment usage profile (EUP) 102. EUP 102 is contained for the entire computing environment 10, e.g., for each application App 60, App 62, App 66 and App 68. For example, ARAM 92 may contain information concerning environment 10 resources being used by each of applications App 60, App 62, App 66 of App 68 as well as the duration of the environment resources have been consumed for each of applications App 60, App 62, App 66 or App 68. Were it found that no constraints were violated, ARAM 92 would obtain a connection for the application associated with the request from Resource Connection database 104 and transmit a response to the client that made the request vis-à-vis the Internet 96 or some other network.

Figure 5:
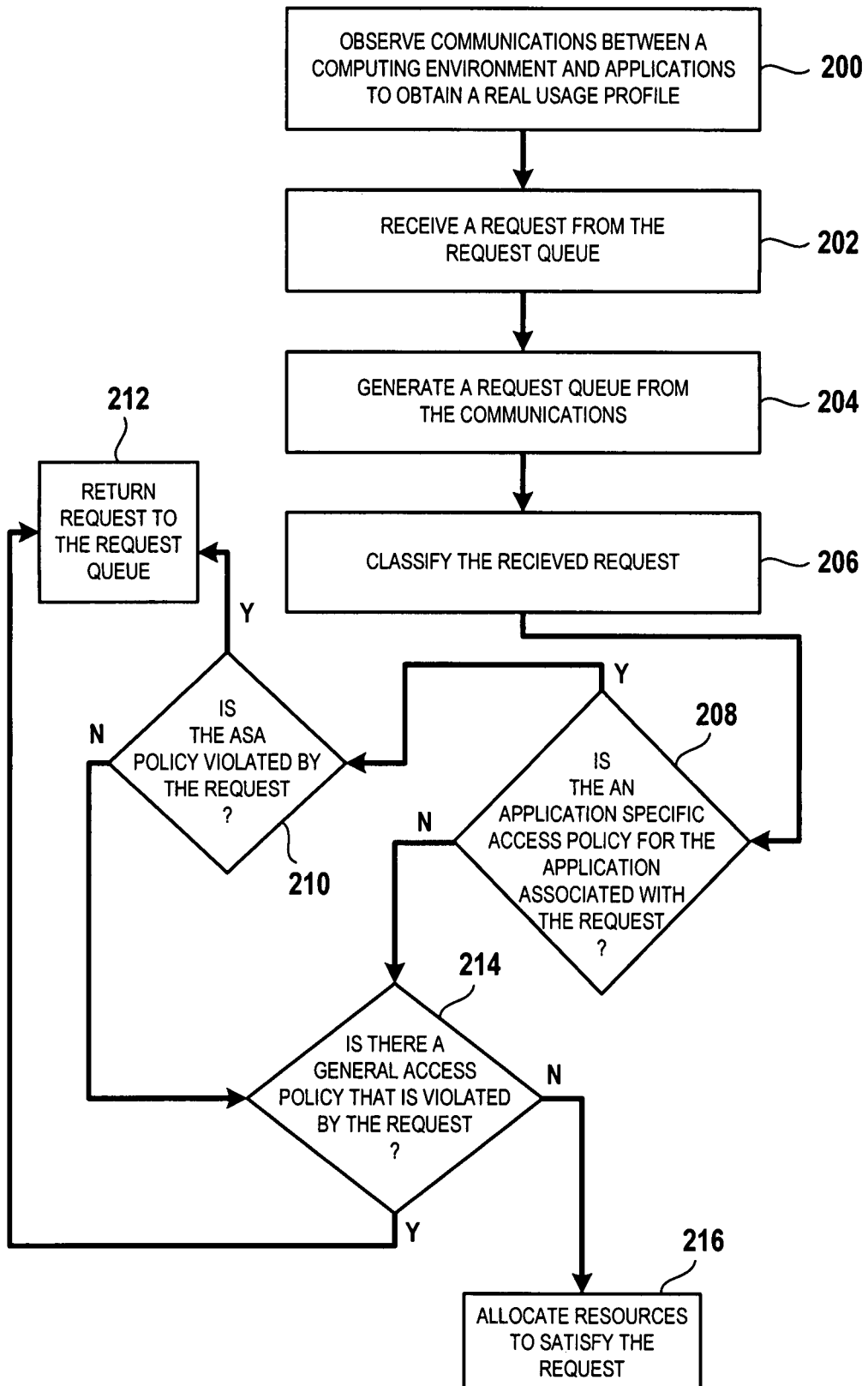
FIG. 5 is a flow diagram showing processing of a request to access environment resources, in accordance with one embodiment of the present invention.

Referring to both FIGS. 4 and 5, in operation PPE 86 and ARAM 92 observe communication between resources of computing environment 10 to applications App 60, App 62, App 66 or App 68, and facilitates development of an RUP for each of the applications App 60, App 62, App 66 or App 68 at function 200. Specifically PPE 86 develops AUP 100 and ARAM 92 develops EUP 102. At function 202, PPE 86 receives requests and at function 204 generates a request queue for the requests received. At function 206, the oldest request in the request queue is parsed, classified and transmitted to ARA 88. At function 208 it is determined whether an ASAP for the application associated with the request is contained in DUP 90. Were an ASAP found that is related to the request, it is determined at function 210 whether the ASAP is violated. Were this the case, the request would be returned to the request queue at function 212. Otherwise, it would be determined whether an EUP 92 would be violated were the request granted at function 214. Were this the case, the request would be returned to the request queue at function 212; otherwise, the resources of the computing environment 10 would be allocated at function 216 to satisfy the request.

Figure 6:
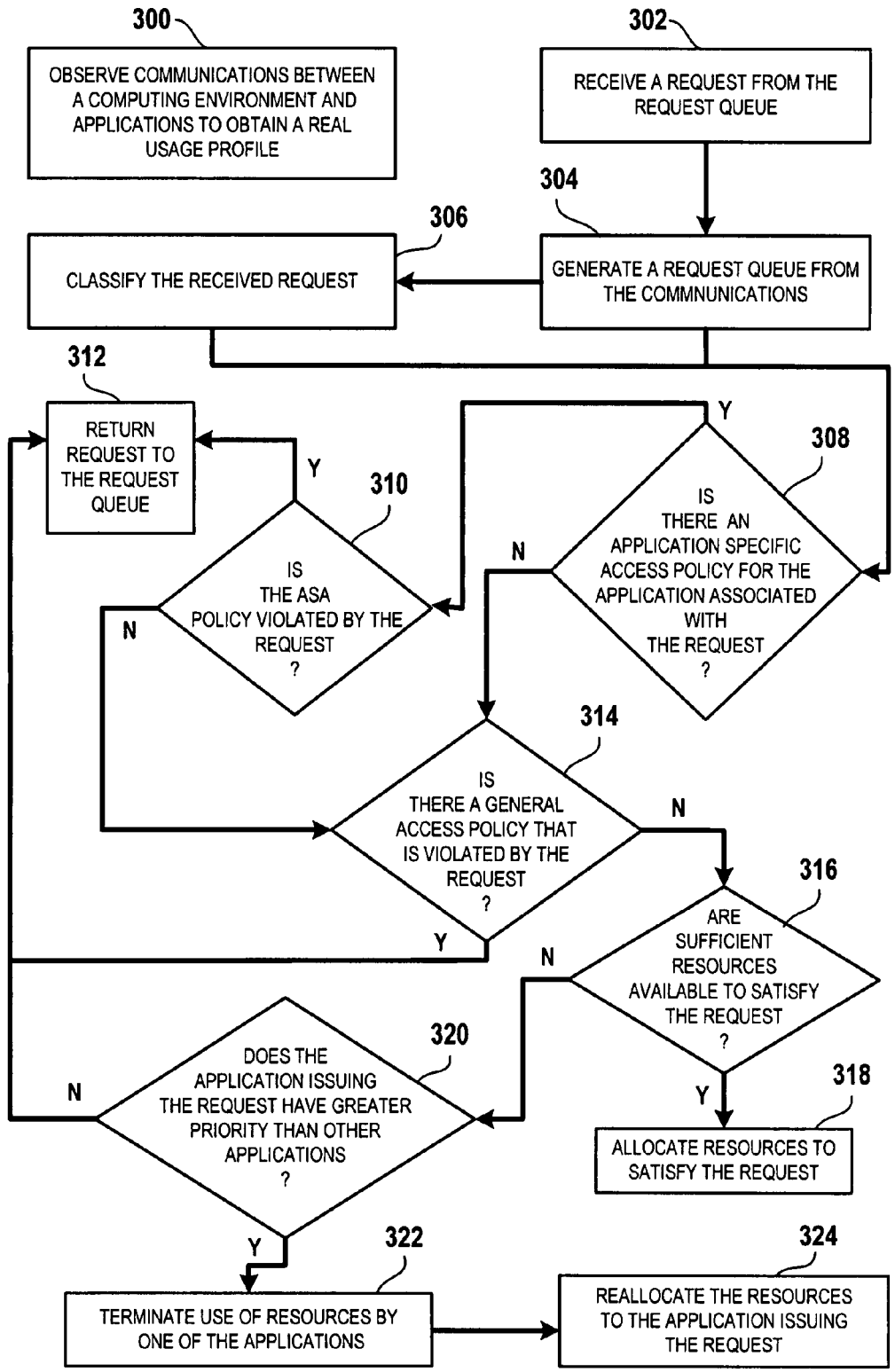
FIG. 6 is a flow diagram showing processing of a request to access environment resources, in accordance with an alternate embodiment of the present invention.

Referring to FIGS. 4, 5 and 6, in accordance with another embodiment of the present invention, functions 300, 302, 304, 306, 308, 310, 312 and 314 are the same as functions 200, 202, 204, 206, 208, 210, 212 and 214, respectively. Were it determined that a general access policy was not violated by allowing the access at function 314, it is next determined whether there are sufficient environment 10 resources, e.g., threads 80 to satisfy the request at function 316. Were it determined that there were a sufficient number for threads 80 to satisfy the request at function 316, environment 10 resources would be allocated to satisfy the request at function 318. Were it determined that there were an insufficient number of threads 80 to satisfy the request at function 316, it would be determined whether or not the request came from an application that had higher priority than any one of the applications App 60, App 62, App 66 or App 68 currently accessing threads 80, at function 320. Were this not the case the request would be denied and the request would be returned to the request queue at function 312. Were the request from one of App 60, App 62, App 66 or App 68 to have a higher priority than one or more of the applications currently accessing threads 80, then access to one of threads 80 by one of the applications App 60, App 62, App 66 or App 68 not generating the request would be terminated at function 322. For example, the request may be from an originator that has a higher priority than the originator of the requests that resulted in access to threads 80 by one or more of applications App 60, App 62, App 66 and App 68. Alternatively, priority may also be determined by looking at processing quality of environment 10 resources being consumed by the request. As a result, were it determined that the incoming request would be completed more quickly than one or more of currently processed requests, the incoming request would be allocated a thread by terminating access to the thread by one of the existing requests. It should be noted that the priorities may vary in real-time and/or may be fixed so as to apply to all requests. At function 324 the threads 80 identified at function 116 would be reallocated to the application that generated the request.

The foregoing description is exemplary and it should be understood that many variations and modification to the above-described invention are contemplated herein. For example, the functions described above with respect to the various embodiments of the invention the also be embodied as computer readable code on a computer readable medium in addition to being the memory space of system. The computer readable medium is any data storage device that can store data, which can be thereafter be read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. The scope of the invention should, therefore, be limited with reference to the above description, the instead should be determined with reference to the appended claims along with their full scope of equivalents.

What is claimed is:

1. A method of managing consumption of computing environment resources by multiple applications, said method comprising:
    observing communication between said computing resources and said multiple applications to obtain a real usage profile (RUP), for one of the multiple applications, wherein said computing resources are threads from a thread pool;
    receiving a request to consume resources of said computing environment for said one of said multiple applications, wherein said computing environment includes a virtual machine layer with an application server that runs said multiple applications;
    determining whether granting said access violates a desired usage profile (DUP) based upon said RUP, were said request granted.

2. The method as recited in claim 1 wherein determining further includes ascertaining whether said one of said multiple applications has exceeded a resource consumption limit.

3. The method as recited in claim 1 wherein determining further includes ascertaining whether said one of said multiple applications has exceeded a resource consumption limit during a predetermined period of time.

4. The method as recited in claim 1 further including establishing said DUP by ascertaining a number of threads in said computing environment and establishing a maximum percentage of said number of threads over which said one of said multiple applications may communicate.

5. The method as recited in claim 1 further including generating additional RUPs for the remaining applications of the multiple applications, with each RUP being associated with one of said multiple applications that differs from the RUP associated with the remaining applications of said multiple applications and ascertaining whether said one of said multiple applications has exceeded a resource consumption limit based upon the RUPs of the remaining applications of said multiple applications.

6. The method as recited in claim 5 further including assigning a DUP to the remaining applications of said multiple applications and determining whether of one of the DUP associated with one of said remaining applications changes in response to said request.

7. The method as recited in claim 5 further including assigning a DUP to the remaining applications of said multiple applications and changing one of the DUP associated with one of said remaining applications changes in response to said request.

8. A computer-readable medium having stored thereon instructions to manage consumption of resources of a computing environment by multiple applications, said instructions, when executed by a microprocessor, operable to:
    observe communication between said computing resources and said multiple applications to obtain a real usage profile (RUP), for one of the multiple applications, wherein said computing resources are threads from a thread pool and wherein said computing environment includes a virtual machine layer with an application server that runs said multiple applications; and
    determine whether granting said access violates a desired usage profile (DUP) based upon said RUP, were said request granted.

9. The computer-readable medium as recited in claim 8 including instructions to ascertain whether said one of said multiple applications has exceeded a resource consumption limit.

10. The computer-readable medium as recited in claim 8 wherein said instructions to determine further includes a subroutine to ascertain whether said one of said multiple applications has exceeded a resource consumption limit during a predetermined period of time.

11. The computer-readable medium as recited in claim 8 wherein said instructions to determine further includes a subroutine to ascertain whether said one of said multiple applications has exceeded a resource consumption limit based upon the RUP of the remaining applications of said multiple applications.

12. The computer-readable medium as recited in claim 8 further including instructions to assign a DUP to the remaining applications of said multiple applications and instructions to determine whether of one of the DUP associated with one of said remaining applications changes in response to said request.

13. The computer-readable medium as recited in claim 8 further including instructions to assign a DUP to the remaining applications of said multiple applications and decode to change one of the DUP associated with one of said remaining applications changes in response to said request.

14. The computer-readable medium as recited in claim 8 further including instructions to establish a DUP that includes a first sub-routine to ascertain a number of threads in said computing environment and a second sub-routine to establish a maximum percentage of said number of threads over which said one of said multiple applications may communicate.

15. A computing environment comprising:
    a processing subsystem, wherein said processing subsystem includes a virtual machine layer with an application server;
    a plurality of applications to be operated on by said processing subsystem to carryout a process having a set of threads associated therewith;
    a protocol processing engine (PPE) to receive a request to consume resources of said computing environment by allowing access to one of said plurality of applications, said PPE including an application usage profile for a subset of said plurality of applications, wherein said resources are threads from a thread pool;
    application resource allocation (ARA) logic to communicate between said PPE and a desired usage profile (DUP) for said plurality of applications;
    an application resource allocation manager (ARAM) in data communication with said PPE, said ARAM storing an environment usage profile (EUP), with said ARA logic comparing said AUP with said DUP to determine whether to grant said request and said ARAM comparing said EUP with said DUP to determine whether to grant said request.

16. The environment as recited in claim 15 wherein said ARA logic, in response to said request, ascertains whether said one of said multiple applications has exceeded a resource consumption limit.

17. The environment as recited in claim 15 wherein said ARA logic, in response to said request, ascertains whether said one of said plurality of applications has exceeded a resource consumption limit during a predetermined period of time.

18. The environment as recited in claim 15 wherein said ARAM, in response to said request, ascertains whether said one of said plurality of applications has exceeded a resource consumption limit based upon the EUPs of the remaining applications of said plurality of applications.

19. The environment as recited in claim 15 wherein said ARA logic, in response to said said request, passes said request to said ARAM upon determining that said one of said plurality of application has not exceeded a resource consumption limit.

20. The environment as recited in claim 15 wherein said DUP includes information concerning a maximum percentage of threads of said computing environment over which each of said plurality of applications communicate.

\* \* \* \* \*

UNITED STATES PATENT AND TRADEMARK OFFICE
CERTIFICATE OF CORRECTION

| | | |
|---|---|---|
| PATENT NO. | : 7,711,822 B1 | Page 1 of 1 |
| APPLICATION NO. | : 11/691434 | |
| DATED | : May 4, 2010 | |
| INVENTOR(S) | : Sreeram Duvur et al. | |

It is certified that error appears in the above-identified patent and that said Letters Patent is hereby corrected as shown below:

Title Page;

On the face page, in field (75), in column 1, in "Inventors", line 2, delete "Provost" and insert -- Prevost --, therefor.

On the face page, in field (57), in column 2, in "Abstract", line 2, after "and a" delete "and a".

On the face page, in field (57), in column 2, in "Abstract", line 12, after "whether the" delete "whether".

In column 2, line 8, after "indicators" insert -- . --.

In column 2, line 15, before "system" delete "and a".

In column 2, line 25, before "granting" delete "whether".

In column 10, line 4, in claim 19, after "said" delete "said".

Signed and Sealed this
Nineteenth Day of April, 2011

David J. Kappos
*Director of the United States Patent and Trademark Office*